United States Patent [19]

Nicholson

[11] Patent Number: 4,585,238
[45] Date of Patent: Apr. 29, 1986

[54] CHANNELED RING SEALS WITH SPRING RINGS

[76] Inventor: Terence P. Nicholson, Calf Hall, Muggleswick, Derwentside, Co. Durham, England

[21] Appl. No.: 768,146

[22] Filed: Aug. 22, 1985

[30] Foreign Application Priority Data

Aug. 22, 1984 [GB] United Kingdom ............... 8421326

[51] Int. Cl.$^4$ ............................................. F16J 15/12
[52] U.S. Cl. .................................. 277/205; 277/227; 277/235 R
[58] Field of Search ................ 277/152, 157, 164–166, 277/227, 228, 205, 206 R, 206 A, 235 R

[56] References Cited

U.S. PATENT DOCUMENTS

| | | | |
|---|---|---|---|
| 1,871,299 | 8/1932 | Bragg et al. | 277/206 X |
| 2,326,489 | 8/1943 | Payne | 277/84 X |
| 2,451,888 | 10/1948 | Thompson | 277/205 X |
| 3,114,561 | 12/1963 | Creath et al. | 277/205 X |
| 3,301,568 | 1/1967 | Perry | 277/206 X |
| 3,414,276 | 12/1968 | Faccou et al. | 277/206 X |

FOREIGN PATENT DOCUMENTS

| | | | |
|---|---|---|---|
| 2310365 | 11/1973 | Fed. Rep. of Germany | 277/205 |
| 1231867 | 4/1960 | France | 277/205 |
| 589768 | 6/1947 | United Kingdom | 277/152 |

*Primary Examiner*—Robert S. Ward
*Attorney, Agent, or Firm*—Fidelman, Wolffe & Waldron

[57] ABSTRACT

A ring seal of the kind comprising an annular jacket (1) of relatively yieldable material with a channel containing an energizing spring to impart resilience thereto, is characterized in that the channel is of substantially part-elliptical profile and contains a partly spaced spring ring (2) of channel shaped radial profile. The spring ring comprises a pair of metal rings (2a, 2b) which have axial slits and are secured together around their outer periphery prior to insertion in the jacket channel. Additionally the spring ring may have a plane circular ring welded thereto in a central diametric plane and to this latter ring there may be secured a dual component cylindrical protection ring having its axis coincident with the axis of the ring seal.

3 Claims, 9 Drawing Figures

CHANNELED RING SEALS WITH SPRING RINGS

This invention relates to ring seals of the kind comprising an annular jacket of relatively yieldable material which is of channel shaped radial cross-section and to which resilience is imparted by an internal energising spring ring which is located in the channel. The jacket may be made of material having a low friction co-efficient such as Teflon (Registered Trade Mark). The spring may be made of either metal or elastomer in various configurations. It may thus be of helically coiled construction or of channel shaped radial cross-section. In our co-pending patent application Ser. No. 772,568 filed Sept. 4, 1985, there is proposed a ring seal of the kind referred to for static sealing purposes.

Such ring seals may be used as static seals, that is to say for sealing between two static mating faces or as dynamic seals that is to say for sealing, externally or internally, reciprocating or rotating shafts in relation to adjacent tubes, casings or the like.

The present invention is concerned however with dynamic ring sealing and has been devised with the object of providing an improved dynamic ring seal of the kind referred to which is less liable to failure by metal spring fatigue or dislodgement of the spring from the jacket. Some typical embodiments of the invention are illustrated in the accompanying drawings and will hereinafter be described.

In these drawings:

FIGS. 1 to 4 inclusive are fragmentary sectional views which respectively show the four different embodiments in a typical working environment;

In each of FIGS. 1 to 4 inclusive there is shown a rotating or reciprocating shaft F which projects rotating end wall C. This end wall has an annular cavity which accommodates the sealing ring and the sealing ring is held in place by an annulus D which is tightened on to the casing wall C by means of a stud E.

Figure 6:
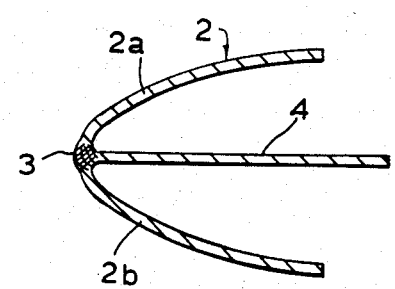
Figure 7:
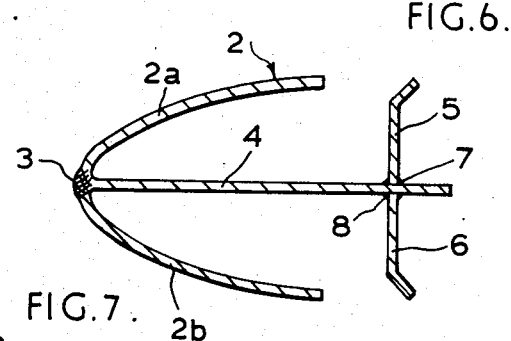
Figure 8:
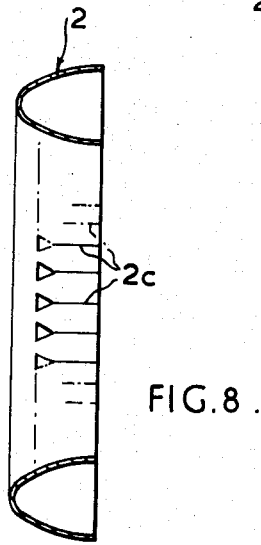
FIG. 8 is a diametric section through an energising spring ring showing its mode of construction.
Figure 9:
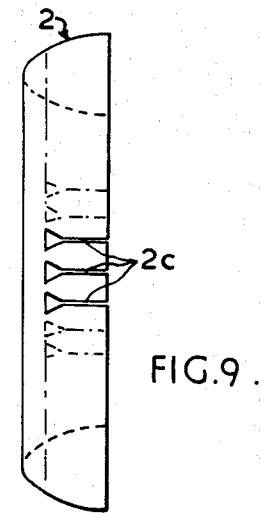
FIG. 9 is a side elevation of the energising spring ring as shown in FIG. 8.

In each instance the sealing ring comprises an outer machined jacket made of relatively yieldable, low-friction material such as Teflon (Registered Trade Mark). The jacket has a channel of substantially semi-elliptical radial profile which accommodates an energising spring which is also of substantially semi-elliptical radial profile. The spring is made of any suitable resilient material such as phosphor bronze, spring steel, stainless steel or Inconel or Nimonic high nickel alloys, depending upon the intended operational environment. Further, as indicated in each of FIGS. 5, 6 and 7 each spring ring comprises an inner ring component 2a and an outer ring component 2b which are united by welding 3. Further, as shown in FIG. 8, the inside wall of the spring is formed with a series of parallel slits 2c which terminate in triangular shaped openings. The outside wall of the spring is also formed with similar slits 2d, as shown in FIG. 9, but the slits 2d are wider than the slits 2c because the latter opens slightly due to expansion of the ring when it is fitted whereas the slits 2d have to allow for the reduction in overall diameter which occurs when the ring is fitted into the jacket.

Figure 1:
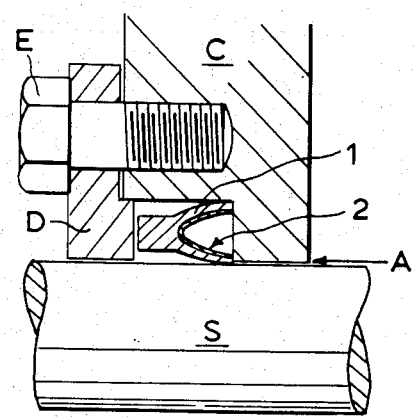
Figure 2:
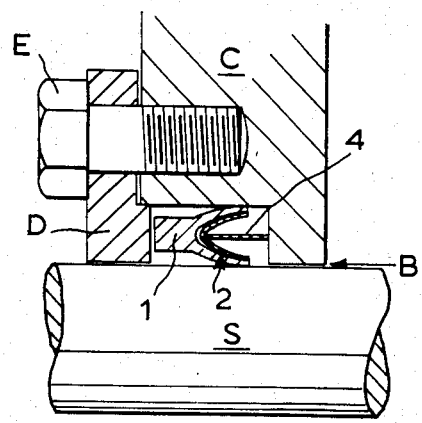
Figure 5:
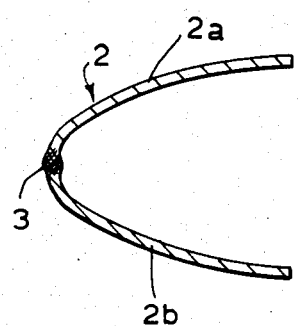
FIGS. 5, 6 and 7 are radial sections of energising spring rings which respectively form part of the sealing rings illustrated in FIGS. 1 to 3.

In FIG. 1 the sealing ring is resisting a static pressure applied to the direction of the arrow A and the sealing ring has the simple construction illustrated in FIG. 5. In FIG. 2 however the sealing ring is resisting a pumping pressure B and has the form illustrated in FIG. 6, that is to say it has centrally welded thereto a plane circular ring 4. This circular ring prevents the sealing ring as a whole from being drawn backwards and forwards into this recess when the shaft reciprocates.

Figure 3:
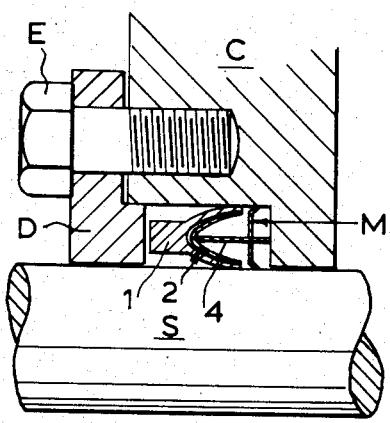

The arrangement illustrated in FIG. 3 is specifically intended to protect the recess in which the sealing ring is located from foreign matter tending to flow in the direction indicated by the arrow M. Thus as also shown in FIG. 7 there is attached by welding 7, 8, a dual component protection ring 5, 6.

Figure 4:
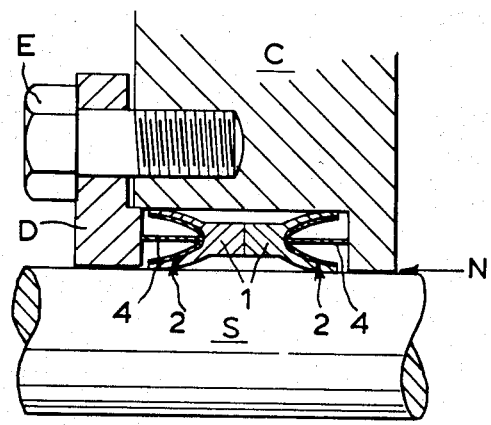

Finally, as indicated in FIG. 4, and for the purpose of sealing against alternating pressure and vacuum in the space 10 there is fitted back to back, in an enlarged recess in the casing C two sealing rings of the kind shown and described in reference to FIG. 2.

In all instances, it is to be understood that under nil pressure conditions there will normally be some expansion space between the outer surface of the spring ring and the inner surface of the outer jacket.

Although in the foregoing described embodiments the sealing ring itself remains bodily static it is to be understood that the sealing ring may be used in or in conjunction with a moving component such as, for instance, a piston.

If desired, the sealing ring jacket 1 could be machined to provide, at the entrance of the channel inner and outer lips which would project over the edges of the spring ring to prevent all possibility of the latter being outwardly dislodged.

If desired spring rings could be electrolytically coated or coated with some low-friction material to suit a particular environment.

One of the main advantages of making the spring from two pieces of metal is that metal of different thicknesses can be used for the components, thus varying the characteristics of the sealing ring as a whole. For instance if the sealing ring is seaing on a stationary outer element and a rotating centre shaft, the outer part of the spring may be produced from thicker material which results not only in greater sealing capability but also prevents the seal from rotating in its housing, and vice versa if the element was rotating and the shaft was stationary.

I claim:

1. A ring seal of the kind referred to characterised in that a channel in an annular jacket is of substantially part-elliptical radial profile and contains a partly spaced spring ring of partly elliptical radial profile comprised of a pair of metal rings which have axial slits and are secured together around their outer periphery prior to insertion within the jacket.

2. A ring seal as claimed in claim 1 in which the spring ring has a plane circular ring situated in a central diametric plane secured thereto.

3. A ring seal as claimed in claim 2 in which there is secured to the plane circular ring at its radially inner part a dual component cylindrical protection ring having its axis coincident with the axis of the ring seal.

* * * * *